United States Patent [19]

Luscombe

[11] 4,060,028
[45] Nov. 29, 1977

[54] STACK FORMING VEHICLE

[76] Inventor: Gene A. Luscombe, Dolliver, Iowa 50531

[21] Appl. No.: 711,107

[22] Filed: Aug. 2, 1976

[51] Int. Cl.² .............................. B30B 3/02; B60P 1/32
[52] U.S. Cl. ..................................... 100/100; 56/344; 100/173; 100/210; 214/82; 214/518
[58] Field of Search ............... 100/100, 173, 210, 218, 100/215; 214/518–522, 350, 82; 56/344, 345, 346; 193/3

[56] References Cited

U.S. PATENT DOCUMENTS

| | | | |
|---|---|---|---|
| 3,840,134 | 10/1974 | Luscombe | 214/518 |
| 3,922,838 | 12/1975 | Kline | 214/518 |

Primary Examiner—Billy J. Wilhite
Attorney, Agent, or Firm—Williamson, Bains, Moore & Hansen

[57] ABSTRACT

A towed type wheeled stack forming vehicle includes a vehicle body in which a cropped forage crop, such as hay, is compacted by a reciprocating roller device positioned within the vehicle body. The forage crop is discharged into the vehicle body through a telescopic tubular distributor which is shiftable longitudinally of the vehicle body to evenly distribute the crop in a longitudinal direction. The distributor mechanism is also provided with a lateral deflector which is continuously shiftable in a lateral direction to assure uniform distribution of the crop in the vehicle body in a lateral direction. A stack removing pusher member is positioned interiorly of the vehicle body and is shiftable rearwardly from a forward position, adjacent the front wall of the vehicle body, to progressively force the formed stack rearwardly from the vehicle body. The drive mechanism for the stack removing pusher member is also drivingly connected with the ground engaging wheels so that the latter are driven forwardly as the stack is forced rearwardly from the vehicle body.

6 Claims, 7 Drawing Figures

STACK FORMING VEHICLE

SUMMARY OF THE INVENTION

This invention relates to a stack-forming vehicle and more specifically to a towed type wheeled stack forming vehicle which forms chopped hay, delivered thereto by a forage harvester or the like, into a stable compact stack.

It is an object of this invention to provide a tow-type stack forming vehicle in which a chopped forage crop is continuously compacted by a roller type compaction device and wherein the form stacked is discharged from the rear of the vehicle by the action of a rearwardly driven pusher structure simultaneously as the vehicle is driven in a forward direction. In this respect, the means for driving the pusher structure rearwardly is also drivingly connectable with the ground wheels to assure forward movement of the vehicle during the stack unloading operation. With this arrangement, the formed haystack may be readily unloaded while minimizing the chance occurrence of damage to the formed stack.

Another object of this invention is the provision of a distributor device for distributing the chopped forage crop evenly and uniformly in the vehicle body both in a lateral and a longitudinal direction.

These and other objects and advantages of this invention will more fully appear from the following description made in connection with the accompanied drawings wherein like reference characters refer to the same or similar parts throughout the several views.

FIGURES OF THE DRAWINGS

DESCRIPTION OF THE PREFERRED EMBODIMENT OF THE INVENTION

Figure 1:
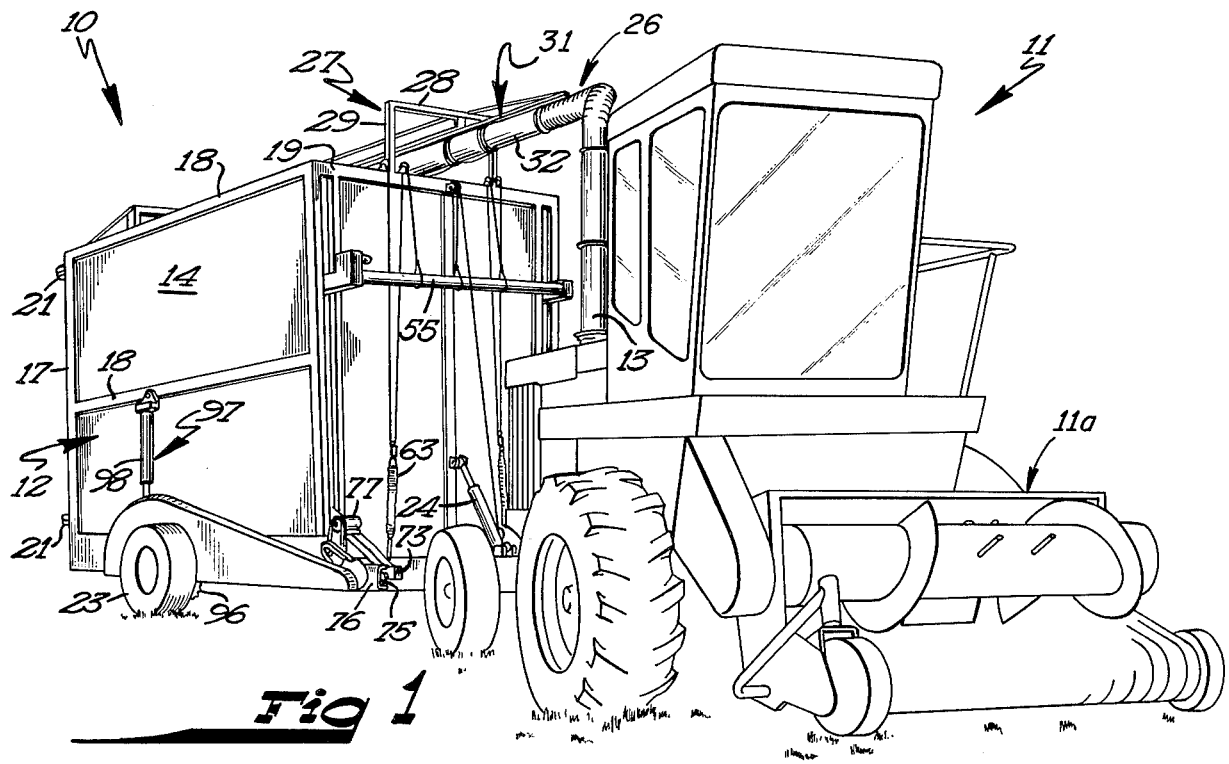
FIG. 1 is a front perspective view of my novel stack-forming vehicle illustrated in connected and towed relation with a conventional self-propelled forage harvester implement.

Referring now to the drawings and more specifically to FIG. 1, it will be seen that one embodiment of my novel stack forming vehicle or stack wagon, designated generally by the reference numeral 10, is there shown. It will also be seen that my stack-forming vehicle 10 is connected in towed relation with respect to a self-propelled conventional forage harvester machine 11, which is of the type for chopping forage crop, such as hay into relatively small pieces. The forage harvesting machine 11 is provided with a pick up head 11a for picking up windrowed crops, such as hay and impelling the crops rearwardly into the stack forming vehicle during the stack forming operation. It will be noted that the forage harvesting machine 11 has a discharge tube 13 which projects vertically and through which the forage crop is impelled.

The stack-forming vehicle 10 includes a vehicle body 12 which is comprised of substantially rectangular shaped parallel sidewalls 14, a vertically disposed perforated front wall 15, a rear door or closure structure 16, and a floor or bottom wall 16a. In the embodiment shown, the vehicle body 12 is of generally rectangular shape configuration and includes vertical frame element 17, longitudinal frame elements 18 and transverse frame elements 19. The side walls, perforated front wall, rear door structure 16 and floor 16a are rigidly affixed to the various frame elements.

The rear door structure 16 includes a pair of substantially identical vertically disposed rectangular shaped door panels 20 each being hingedly connected to one of the side walls 14 by means of hinges 21. A pair of double acting hydraulic cylinder units (not shown) are each mounted on one of the side walls 14 and each is pivotally connected to a bracket affixed to one of the door panels 20 which permits the door panels to be shifted between open and closed positions by extension and retraction of the hydraulic cylinder units.

Figure 3:
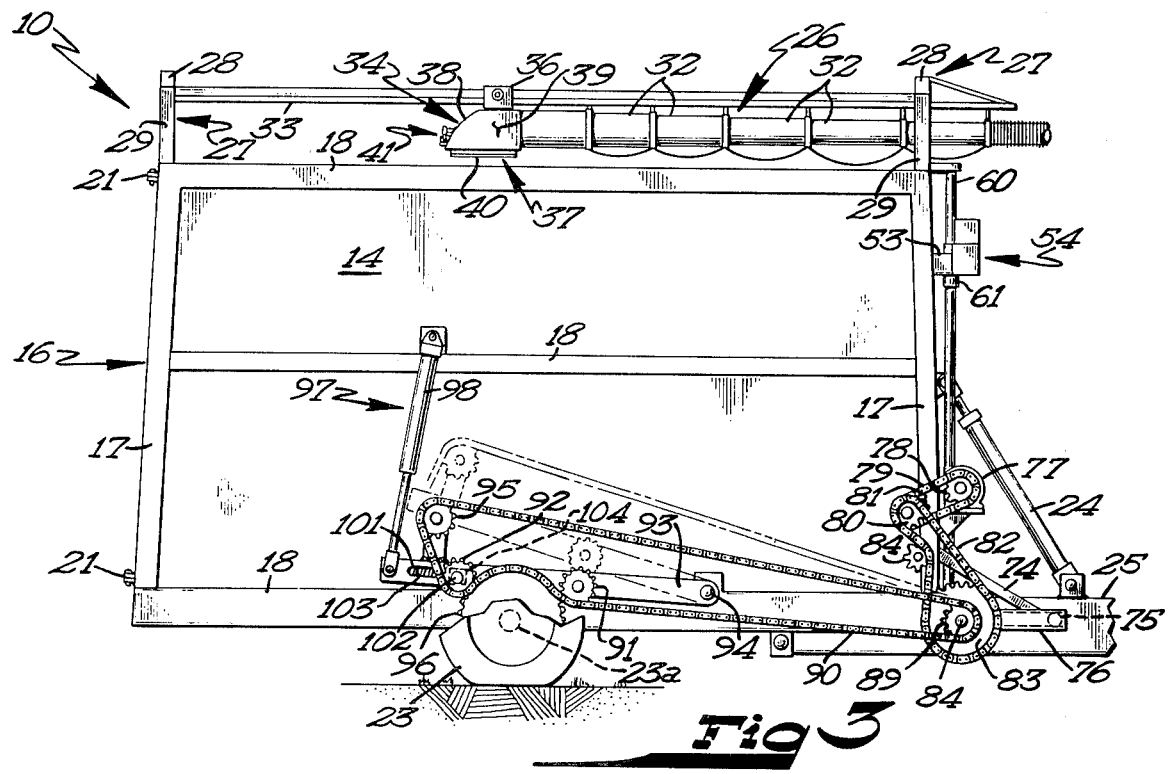
FIG. 3 is a side elevational view of the stack-forming vehicle.
Figure 4:
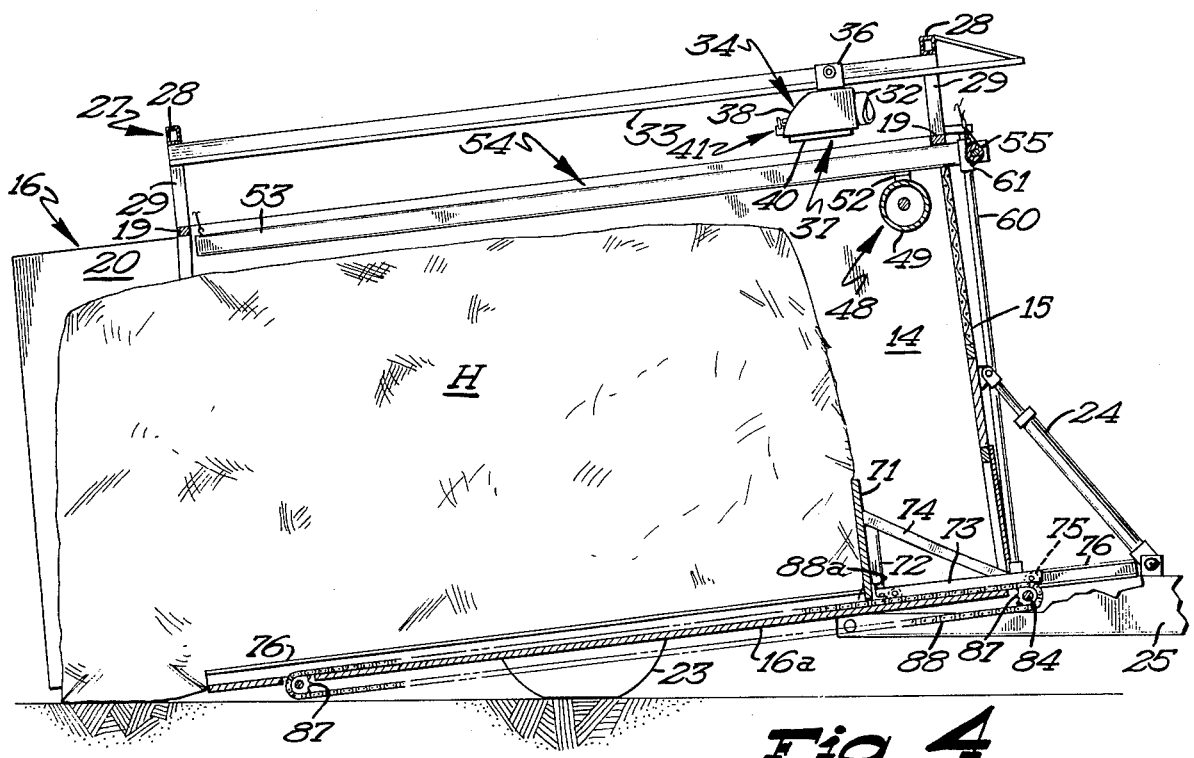
FIG. 4 is a longitudinal sectional view of the vehicle, the latter being disposed in a rearwardly inclined unloading position and illustrating the manner in which the formed stacked is discharged from the vehicle.
Figure 6:
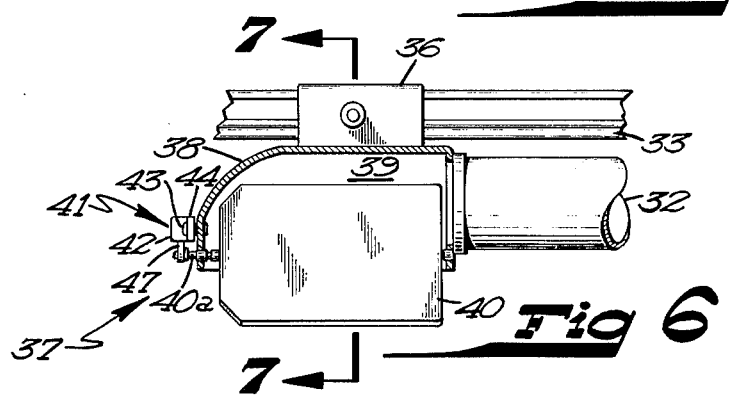
FIG. 6 is a fragmentary side elevational view of a portion of the distributor mechanism illustrating the lateral deflector device associated therewith.
Figure 7:
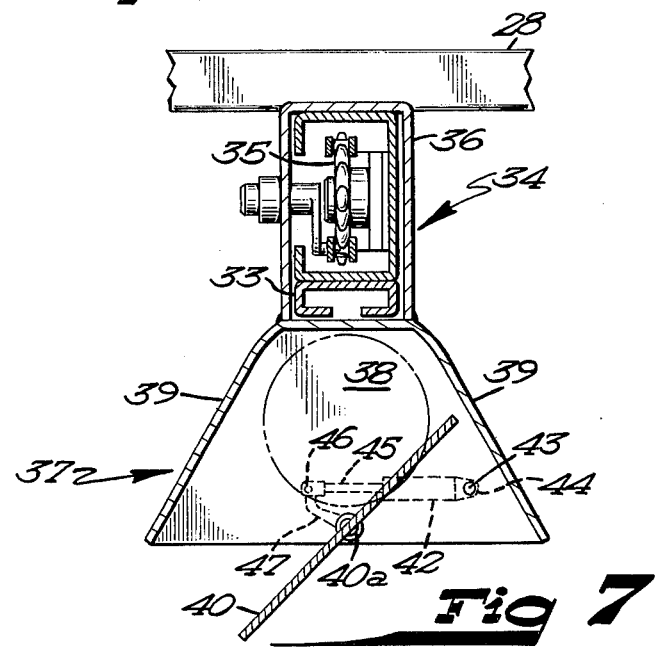
FIG. 7 is a cross sectional view taken approximately along line 7—7 of FIG. 6 and looking in the direction of the arrows.

The vehicle body is supported for travel over the surface of the ground by a pair of ground engaging wheels 23 mounted on stub axles 23a. The vehicle body is adapted to pivot or tilt back the wheel axle between a horizontal position as illustrated in FIG. 3 and a rearwardly inclined position as illustrated in FIG. 4. To this end, a pair of double acting hydraulic cylinder units 24 are provided each being mounted on a hitch 25 and each being connected to the vehicle body. The hitch 25 provides a connection between the stack-forming vehicle and the prime mover such as the forage harvesting machine 11. It is also pointed out that the vehicle body 12 is pivotally connected with the hitch in the manner of my U.S. Pat. No. 3,907,139.

The vehicle body does not have a roof or top wall but is provided with means for supporting a distributor mechanism 26 at the upper portion of the body. This support means includes longitudinally spaced apart front and rear inverted, U-shaped frames 27 which are rigidly secured to the upper transverse frame members and which are located generally centrally of the vehicle body 12. Each U-shaped frame member includes a transverse member 28 having a pair of legs 29 integrally formed therewith and depending therefrom.

The distributor mechanism 26 includes an elongate flexible coupling pipe which is connected at one end to the upper end portion of the discharge tube of the forage harvesting machine and is connected at its rear end to one end of the telescoping tubular distributing structure 31. The distributor structure 31 is identical in construction and operation to that disclosed in my U.S. Patent No. 3,907,139 and is incorporated by reference with respect to the present application. Thus the distributor structure is comprised of a plurality of tubular sections 32, each being provided with a vertical guide element which engages in an elongate track 33. The elongate track constitutes part of a rectangular shaped housing 34 which is fixedly connected to the U-shaped support frames 27.

The housing 34 accommodates the chain and sprocket drive 35 which shifts the distributor structure 31 between the extended and collapsed position. It will be appreciated that the chain and sprocket drive 35 is connected to a suitable hydraulic motor and is operatively connected to the rearmost tubular section 32 by means of a carriage 36 which is positioned exteriorly of and engages the housing 34 for slidable movement thereon. It is pointed out that since the construction and operation of the distributor mechanism is substantially identical to that shown in U.S. Pat. No. 3,907,139, and since the disclosure thereof has been specifically incorporated by reference with respect to this application, a detailed explanation of the construction and operation is thought to be unnecessary for the present application. However, it is pointed out that as the chopped hay is blown through the distributor mechanism 26, the distributor mechanism will be continuously extended and retracted thereby assuring uniform distribution of the chopped hay in a for and aft direction.

However, in the embodiment shown, the carriage 36 is connected to a deflector 37 which is slightly different in construction and figuration to the deflector 47 disclosed in my U.S. Pat. No. 3,907,139. It will be noted that the deflector 37 is also rigidly attached to the rear most tubular section 32 and to the carriage 36 but does not have a downwardly projecting portion as provided in my aforementioned U.S. Patent. The deflector mechanism 37 includes a curved central wall 38 which is curved downwardly and rearwardly and which has fixedly connected thereto side walls 39. The deflector mechanism also includes a moveable lateral deflector plate 40 which is pivotally connected by pivot pin 40a to the rear most tubular section 34 and to the central wall 38. It will therefore be seen that the pivotal axis of the lateral deflector plate 40 extends longitudinally of the general longitudinal axis of the distributor mechanism 26.

Means are provided for pivoting the lateral deflector plate and this means includes a hydraulic ram 41 which includes a hydraulic cylinder 42 pivotally mounted on the central wall 38 by a pivot pin 43 connected to a bracket 44. The piston rod 45 of the hydraulic ram is pivotally connected by a pivot 46 to a bracket 47 which is affixed to the lateral deflector plate 40. It will be seen that when the piston rod 45 is extended and retracted, the lateral deflector plate will be pivoted in a reciprocating fashion to deflect the chopped hay laterally of the vehicle body. It is pointed out that the hydraulic ram will be operated in a random fashion with respect to the extension and retraction of the distributor mechanism 26 to thereby assure even distribution laterally of the vehicle body as well as longitudinally of the vehicle body.

Figure 2:
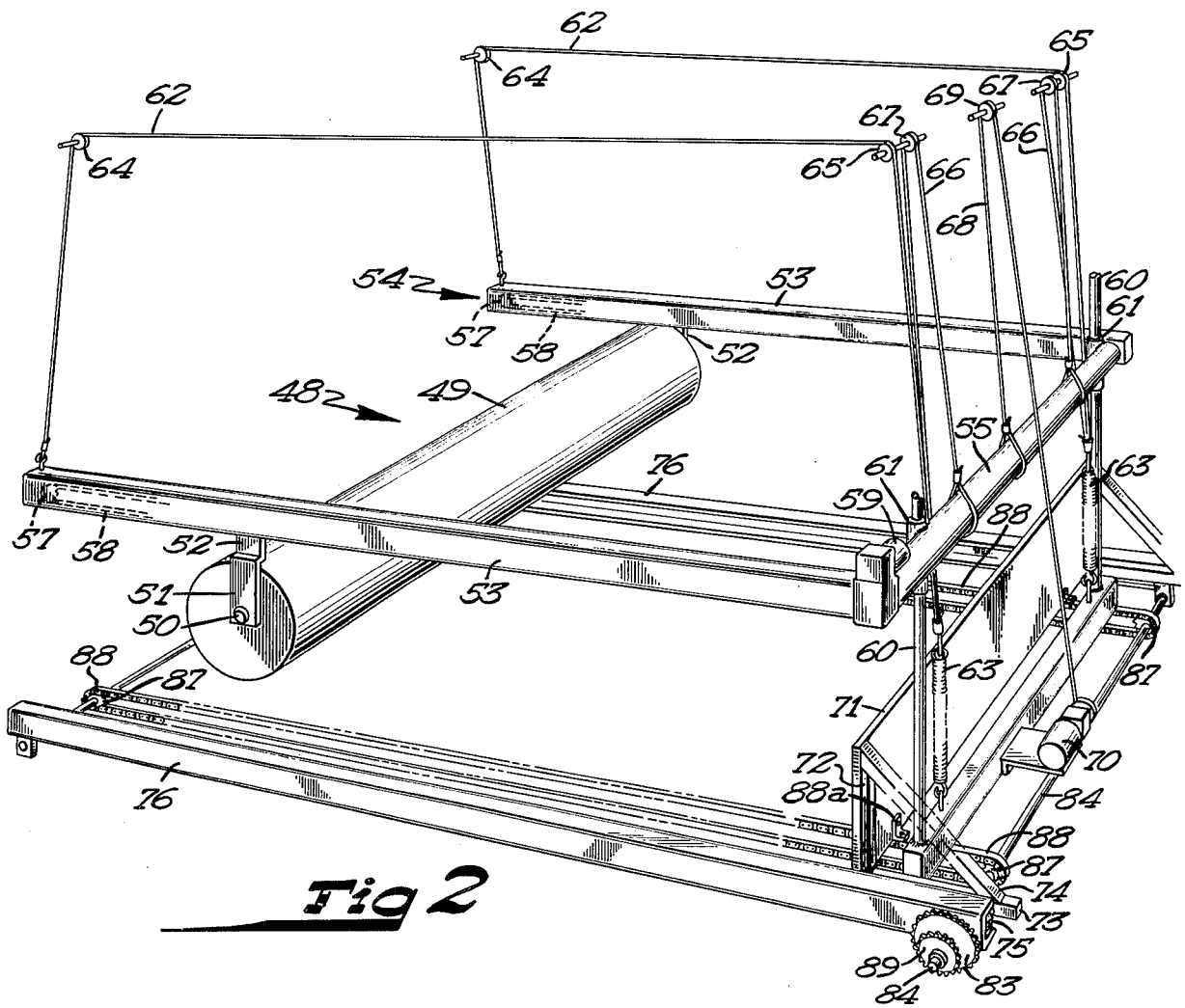
FIG. 2 is a diagrammatic perspective view of the roller compaction mechanism.

The stack-forming device is also provided with a compaction mechanism 55, as shown in FIG. 2, which is similar in construction and operation to that shown in my U.S. Pat. No. 3,907,139. In this respect, the compaction mechanism includes an elongate cylindrical compaction roller 49 which extends transversly of the vehicle body and which has a length dimension which corresponds to the width dimension of the vehicle body. The axle 50 of the roller 49 is journaled in brackets 51 which project upwardly therefrom and which have track engaging elements 52 at the upper ends thereof that are positioned in and are moveable with respect to elongate channel shaped tracks 53 of a guide structure 54. It will be noted that the guide structure not only includes the elongate channel shaped tracks 53 but also includes an elongate rigid transverse member 55 which is positioned forwardly of the front wall 15. In this respect, the tracks 53 project through openings 56 in the front wall 15 to permit vertical movement of the guide structure.

The tracks 53 are provided with sprockets 57 at their respective front and rear ends about which are trained drive chains 58. The drive chains 58 are drivingly connected to a hydraulic motor 59 located at the front end portion of one of the tracks 53. Because the drive mechanism compaction mechanism disclosed in the present application is identical to that shown in my U.S. Pat. No. 3,907,139, the disclosure of this drive means for the roller in my U.S. Pat. No. 3,907,139 is incorporated by reference with respect to the present application. It is pointed out that the only difference in the present compaction device and that of my U.S. Pat. No. 3,907,139 is that the roller 49 is positioned completely below the drive structure to permit the length of the roller to correspond substantially to width dimension between the inner surface of the side walls 14.

In the embodiment shown, the compaction mechanism 48 is vertically shiftable in the vehicle body and the means for permitting this vertical movement comprises a pair of laterally spaced apart elongate vertical guide posts 60. The guide post are located forwardly of the front wall 15 and are fixedly connected to the vehicle body and project upwardly from adjacent the lower end thereof. These guide posts are engaged by vertically disposed tubular guide elements 61 which are affixed to the transverse member 55.

Means also provided for maintaining the compaction mechanism in a level condition and this means includes a pair of elongate flexible cables 62 each being connected at one end thereof to a pair of vertically disposed elongate springs 63 also positioned forwardly of the front wall 15. The springs are anchored to the vehicle body frame at their respective lower ends. Each cable 62 is secured at its other end to the rear end position of one of the channel tracks 58 and each cable is chained about a rear pulley 64 and a front pulley 65.

The leveling mechanism also includes a second pair of cables 66 each being secured at one end to the transverse member 55 and each being secured at its other end to one of helical springs 63. Each cable 66 is also chained about a pulley 67 so that vertical movement of the compaction mechanism is yieldably resisted by the helical springs 63.

Means are also provided for retaining the compaction mechanism in an elevated condition when it is desirable to unload the stack from the stack wagon, and this means includes an elongate cable 68 which is secured at one end thereof to the transverse member 55 and which is trained about a pulley 69. The cable 68 is connected at its other end to a conventional power driven winch brake 70.

Although substantially all of the features heretofore mentioned are disclosed in my U.S. Pat. No. 3,907,139, and are incorporated by reference with respect to the present application, it is pointed out that the present application utilizes a unique manner of unloading the formed stack which not only permits easy removal of the stack from the vehicle body but minimizes the occurrence of damage to the stack during the unloading operation. The means for removing the haystack from the wagon comprises a vertically disposed transversely extending generally rectangular shaped pusher member 71 which is positioned within the vehicle body and which is moveable therein. The pusher member 71 extends substantially the entire width of the pusher body but the vertical dimension thereof is substantially less than the vertical dimension of the vehicle body. This pusher member 71 is provided with a pair of frame members at opposite ends thereof each frame member including a vertical frame element 72, a longitudinal frame element 73, and a diagonal brace 74. Each longitudinal frame element 73 has a pair of longitudinal spaced apart rollers 75 journaled thereon, these rollers being positioned in one of a pair of channel-shaped tracks 76 positioned interiorly of the vehicle body adjacent opposite sides thereof. In the embodiment shown, the tracks 76 will be located adjacent the floor of the vehicle and guide the pusher member during its fore-and-aft movement in the vehicle body.

Figure 5:
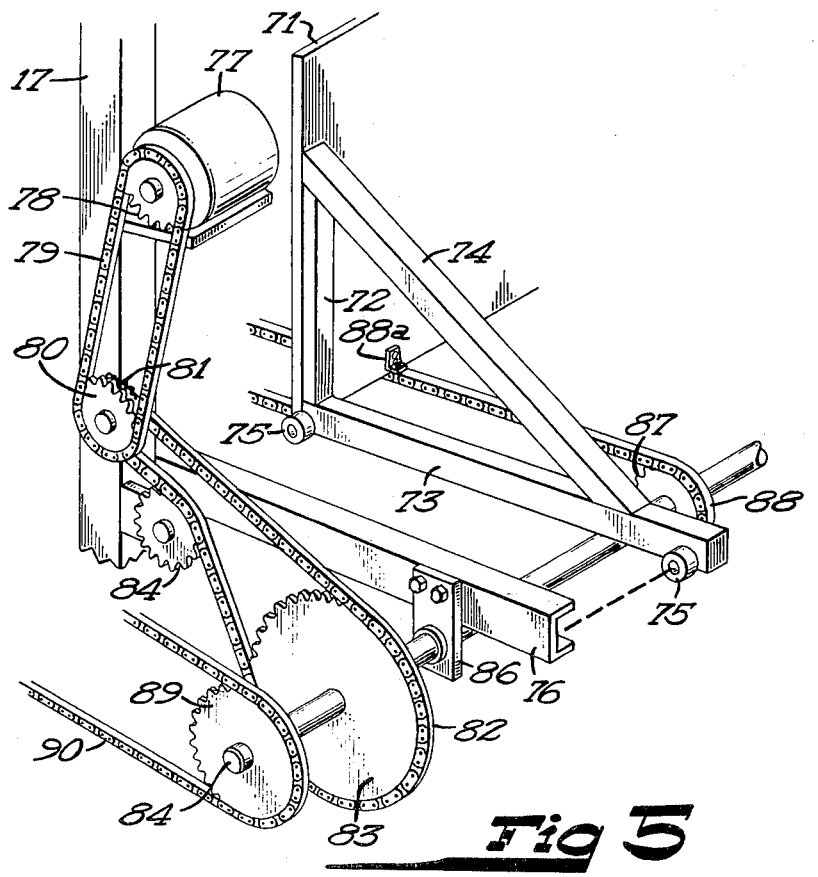
FIG. 5 is a detailed perspective view of the pusher structure illustrating the details of construction thereof.

Means are provided for driving the pusher member 71 in a fore-and-aft direction and this means includes a hydraulic motor 77 which is preferably positioned exteriorly of the vehicle body adjacent one front corner thereof, the hydraulic motor having an output shaft to which is secured a drive sprocket 78. In the embodiment shown, the hydraulic motor is mounted on one of the vertical frame elements 15 adjacent the front of the vehicle body. A chain 79 is trained about the drive sprocket 78 and is also trained about the sprocket 80 which is journaled on a shaft also affixed to the associated vertical frame element 15. A sprocket 81 is also affixed to the same axle as that of sprocket 80 and rotates therewith, as best seen in FIG. 5. A chain 82 is trained about the sprocket 81 and is also trained about a sprocket 83 and a idler sprocket 84 the latter being secured to a bracket affixed to the vertical frame element 17. The sprocket 83 is affixed to a shaft 84 which is journaled in a bearing carried by a bracket 86 which is affixed to one of the tracks 76.

It will be noted that the shaft 84 extends transversely of the vehicle body adjacent the front end thereof and is provided with a pair of laterally spaced apart sprockets 87 affixed thereto, these sprockets being located adjacent opposite sides of the vehicle body. Each of the sprockets 87 has an endless chain 88 trained thereabout, each chain also being trained about another sprocket located adjacent the rear of the vehicle body. The lower run of the chain 88 is affixed to the pusher member 71 so that when the sprocket 83 is rotated in a clockwise direction, as viewed in FIG. 5, the pusher member 71 will be driven rearwardly. In this respect, it is pointed out that the pusher wall is shiftable between a forward position, wherein the pusher wall is disposed closely adjacent the front wall 15 of the vehicle body, and a rearward position wherein the pusher member is moved rearwardly to a point adjacent the rear edge of the bottom wall 16a of the vehicle.

Means are also provided for power driving the ground engaging wheels 23 of the vehicle body in a forward direction as the pusher member 71 is being urged in a rearward direction. This means includes a pair of sprockets 89, each affixed to opposite ends of the shaft 84 and each having an endless chain 90 trained thereover. Each chain is also trained about a front idler sprocket 91 and a rear idler sprocket 92, these sprockets being mounted on an elongate lever 93 pivotally connected to a lower longitudinal frame element 18 by a pivot pin 94. Each chain 90 is also trained about a sprocket 95 which is located above the associated idler sprockets 91 and 92. The axle 23a of each ground engaging wheel has a large drive sprocket 96 affixed thereto, the chain 90 being wrapped around approximately one half of the sprocket 96. Therefore when the chain is in driving relation with the sprocket 96 and when the hydraulic motor 77 is energized, the sprocket 96 will be driven and will drive the associated ground engaging wheels 23.

Means are provided for shifting each chain 90 into and out of driving relation with respect to the large wheel sprocket 96 and this means includes a double acting hydraulic ram 97, each including a cylinder 98 connected to a source of hydraulic power having a moveable piston therein to which is connected a piston rod 99. Each piston rod 99 is pivotally connected by a pivot 100 to one end portion of the associated lever 93 whereby extension and retraction of the piston rod produces vertical swinging movement of the lever 93.

Each lever 93 has an elongate slot 101 in one end thereof, the slot extending longitudinally of the lever. Axle 102 of the sprocket 92 is positioned in the slot and is slidable therein. A helical spring 103 has one end thereof secured to the lever 93 and has its other end affixed to a bearing pin 104 secured to the pulley axle 102. The vehicle spring 103 is a compression spring that tends to urge the pulley 92 to longitudinally end the slot 101 in a direction away from the large sprocket 96 and away from the pivot pin 94. Therefore when the piston rod 99 is retracted, the spring 103 for each lever 93 will cause the pulley 92 to be shifted longitudinally in the slot to the dotted line position as shown in FIG. 5. With this arrangement, the piston rod 99 may be retracted during the loading operation of the vehicle body and may be extended so that the drive chain 98 drivingly engages the sprocket 96 during the unloading operation.

During the operation of the stack forming vehicle 10 the forage harvesting machine will direct the chopped forage crop into the distributor mechanism for distribution into the vehicle body. The distributor mechanism will be continuously extended and retracted to cause even distribution of the crop in a longitudinal direction. The constant movement of the lateral deflector plate also causes even and uniform distribution of the forage crop in a lateral direction since the deflector plate is continuously reciprocated during the loading operation. It is again pointed out that the deflector plate 40 will be randomly reciprocated as related to the extension and retraction of the distributor mechanism.

The compaction mechanism 48 will continuously compact the crop in the vehicle body so that a very firm compact stack is formed. At the end of a stack forming operation, the compaction mechanism 48 will be elevated above the surface of the formed stack by the winch brake 70 and the stack will thereafter be removed from the vehicle.

To this end, the rear door structure 16 will be shifted from the closed position to the open position and the vehicle will be tilted rearwardly and downwardly. The hydraulic motor 77 will be energized to produce rearward movement of the pusher member 71. In this respect, it is pointed out that the pusher member 71 will be disposed at its forward position and in engaging relation with the forward surface of the formed stacked. It is also pointed out that before the unloading operation is begun, the double acting hydraulic rams 97 will be actuated to extend the piston rods 99 and to cause the associated drive chain 90 to be urged into driving relation with the wheel sprockets 96.

Therefore, when the hydraulic motor 77 is energized, the wheel sprockets 96 will be driven in a direction to cause forward movement of the vehicle body as the push member is urged rearwardly. This movement of the ground engaging wheels in a forward direction coordinated with the rearward movement of the pusher member 71 not only facilitates removal of the hay stack from the vehicle but also minimizes any damage to the stack. The pusher member will be continued in its rearward movement when the vehicle body will be driven forwardly until the stack is completely removed. Thereafter, the hydraulic rams 97 will be actuated to retract the piston rod so that the wheels are no longer in driving relation with respect to the hydraulic motor 77. The hydraulic motor 77 will be reversed to retract the pusher member to its original forward postion and the rear doors will be closed so that the vehicle body is again conditioned for the loading operation.

From the foregoing description, it will be seen that I have provided a novel stack-forming wagon which not only permits a compact stack to be formed, but also permits even distribution of the chopped crop during the stack forming operation and further permits ready removal of the stack from the vehicle with a minimum chance of damage.

What is claimed is:

1. A stack forming vehicle adapted to be towed by a prime mover and adapted to receive a chopped forage crop from a crop harvesting device of the type having a discharge spout through which the chopped forage crop is discharged, comprising:

a generally rectangular shaped vehicle body including a bottom wall, a front wall, upstanding substantially opposed vertical sidewalls, a closure structure shiftably mounted on said vehicle body adjacent the rear end thereof and being swingable between a closed position for closing the rear end of the vehicle body, and an open position to permit a formed stacked to be removed rearwardly from the vehicle body, ground-engaging wheels connected with said vehicle body to permit the latter to travel over the surface of the ground, a revolvable compacting roller mechanism positioned within said body and being operable to continuously travel over the surface of the forage crop during the loading of the vehicle body to continuously compact the forage crop therein, a vertical pusher member positioned in upstanding substantially vertical relation within the body and being longitudinally shiftable between a forward position adjacent the front wall of the body and a rearward position adjacent the rear of the body whereby said pusher member will progressively push the form stacked rearwardly from the wagon, when shifted from the forward position to the rearward position, drive means connected with the said pusher member and to a source of power and being operable to shift said pusher member between said forward position and said rearward position, said drive means being operatively connected with said ground engaging wheels and being operable to drive said wheels in a forwardly direction simultaneously as the pusher member is being shifted rearwardly.

2. The stack forming vehicle as defined in claim 1 wherein said pusher member is of substantially flat configuration and has a vertical dimension substantially less than the vertical dimension of the body.

3. The stack forming vehicle as defined in claim 1 and means for selectively engaging and disengaging said drive means with said ground engaging wheels.

4. The stack forming vehicle as defined in claim 1 wherein said drive means comprises a chain and sprocket drive.

5. The stack forming vehicle as defined in claim 1 and an elongate tubular distributor mechanism positioned in said vehicle body and extending longitudinally thereof adjacent the upper portion thereof, said distributor mechanism being extensible and retractable in a front and rear direction and having an outlet adjacent its rear end through which the forage crop is discharged during extension and retraction of the distributor mechanism, means for extending and retracting said distributor mechanism, and a lateral deflector structure swingably mounted on said distributor mechanism adjacent the rear and thereof and being shiftable in a lateral direction to laterally distribute the forage crop discharged through the outlet in said distributor mechanism, and means for shifting said deflector mechanism in a lateral direction.

6. The stack forming vehicle as defined in claim 1 and means for tilting said vehicle body between a horizontal position and a rearwardly inclined position, said vehicle body when in the rearwardly inclined position permitting said formed stack to be removed therefrom.

* * * * *